United States Patent
Choi et al.

(10) Patent No.: US 11,071,075 B2
(45) Date of Patent: Jul. 20, 2021

(54) APPARATUS FOR TRANSMITTING SYNCHRONOUS SIGNAL, TERMINAL FOR RECEIVING SYNCHRONOUS SIGNAL AND METHOD THEREOF

(71) Applicant: SK TELECOM CO., LTD., Seoul (KR)

(72) Inventors: Chang Soon Choi, Seoul (KR); Min Soo Na, Seoul (KR)

(73) Assignee: SK TELECOM CO., LTD., Seoul (KR)

(*) Notice: Subject to any disclaimer, the term of this patent is extended or adjusted under 35 U.S.C. 154(b) by 121 days.

(21) Appl. No.: 16/054,199

(22) Filed: Aug. 3, 2018

(65) Prior Publication Data
US 2018/0343629 A1 Nov. 29, 2018

Related U.S. Application Data

(63) Continuation of application No. PCT/KR2017/003820, filed on Apr. 7, 2017.

(30) Foreign Application Priority Data

Jun. 10, 2016 (KR) .................. 10-2016-0072377

(51) Int. Cl.
*H04W 56/00* (2009.01)
*H04L 27/26* (2006.01)
(Continued)

(52) U.S. Cl.
CPC ........ *H04W 56/001* (2013.01); *H04B 7/0617* (2013.01); *H04B 7/0695* (2013.01);
(Continued)

(58) Field of Classification Search
CPC . H04W 56/001; H04B 7/0617; H04B 7/0695; H04B 7/088; H04L 5/005;
(Continued)

(56) References Cited

U.S. PATENT DOCUMENTS 9,894,624 B2 * 2/2018 Yu .................... H04W 48/12
2011/0316744 A1 12/2011 Morioka et al.
(Continued)

FOREIGN PATENT DOCUMENTS

CN 102342172 A 2/2012
CN 105557049 A 5/2016
(Continued)

OTHER PUBLICATIONS

Chinese Office Action for corresponding Chinese application No. 201780011938.5 dated Jan. 3, 2020, citing the above references.
(Continued)

*Primary Examiner* — Donald L Mills
(74) *Attorney, Agent, or Firm* — Hauptman Ham, LLP

(57) ABSTRACT

The present invention relates to a technique of improving, when performing synchronization between a transmitting device and a receiving device communicating on the basis of a beamforming technique, an overall beamforming synchronization performance by enabling fast beam tracking in a receiving device.

11 Claims, 7 Drawing Sheets

(51) Int. Cl.
*H04L 5/00* (2006.01)
*H04B 7/06* (2006.01)
*H04B 7/08* (2006.01)
*H04B 7/0413* (2017.01)
*H04J 11/00* (2006.01)

(52) U.S. Cl.
CPC ............. *H04B 7/088* (2013.01); *H04L 5/005* (2013.01); *H04L 5/0053* (2013.01); *H04L 27/261* (2013.01); *H04L 27/2662* (2013.01); *H04L 27/2675* (2013.01); *H04B 7/0413* (2013.01); *H04J 11/0036* (2013.01); *H04J 2011/0016* (2013.01); *H04L 27/2656* (2013.01); *H04L 27/2657* (2013.01)

(58) Field of Classification Search
CPC . H04L 5/0053; H04L 27/261; H04L 27/2662; H04L 27/2675
See application file for complete search history.

(56) References Cited

U.S. PATENT DOCUMENTS

| | | | |
|---|---|---|---|
| 2013/0182683 | A1 | 7/2013 | Seol et al. |
| 2016/0165583 | A1 | 6/2016 | Ho et al. |
| 2016/0212631 | A1* | 7/2016 | Shen .................. H04W 56/001 |
| 2017/0311274 | A1* | 10/2017 | Yu ........................ H04W 48/12 |
| 2018/0152273 | A1* | 5/2018 | Kim ..................... H04B 7/0452 |
| 2019/0044584 | A1* | 2/2019 | Lee ..................... H04B 7/0456 |

FOREIGN PATENT DOCUMENTS

| | | |
|---|---|---|
| CN | 105637952 A | 6/2016 |
| EP | 2290836 A1 | 3/2011 |
| KR | 10-2011-0034618 A | 4/2011 |
| KR | 10-2011-0083724 A | 7/2011 |
| KR | 10-2016-0059480 A | 5/2016 |
| WO | 2014/208844 A1 | 12/2014 |
| WO | 2015/093892 A1 | 6/2015 |
| WO | 2015/147717 A1 | 10/2015 |
| WO | 2015147717 A1 | 10/2015 |

OTHER PUBLICATIONS

Radio link problem detection in mmW systems, 3GPP TSG-RAN WG2 Meeting #93bis, Apr. 11-15, 2016, Dubrovnik, Croatia.
The extended European search report for PCT/KR2017003820 dated Jan. 3, 2020, citing above references.
Support for Beam Based Common Control Plane, 3GPP TSG-RAN WG1#85, May 23-27, 2016, Nanjing, P.R. China.
Korean Office Action for corresponding Korean application No. 10-2016-0072377 dated Jan. 22, 2020, citing the above references.
Radio link problem detection in mmW systems, 3GPP TSG-RAN WG2 Meeting #93bis, Apr. 11-15, 2016, Samsung, Dubrovnik, Croatia.
Japanese Office Action dated Sep. 26, 2019, in connection with counterpart Japanese Patent Application No. 2018-552728, citing the above references.
International Search Report for PCT/KR2017/003820 dated Jun. 5, 2017, citing the above reference(s).
Chinese Office Action dated May 8, 2020 in connection with the counterpart Chinese Patent Application No. 201780011938.5, citing the above reference.
Japanese Office Action dated May 19, 2020 in connection with the counterpart Japanese Patent Application No. 2018-552728.
Chinese Office Action dated Jun. 21, 2019, in connection with the Chinese Patent Application No. 201780011938.5 citing the above reference(s).
Indian Office Action dated Sep. 25, 2020, in connection with the Indian Patent Application No. 201817043074 citing the above reference(s).

* cited by examiner

APPARATUS FOR TRANSMITTING SYNCHRONOUS SIGNAL, TERMINAL FOR RECEIVING SYNCHRONOUS SIGNAL AND METHOD THEREOF

CROSS-REFERENCE TO RELATED APPLICATIONS

This application is based upon and claims the benefit of priority from Korean Patent Application No. 10-2016-0072377 filed on Jun. 10, 2016 and is a continuation of the International Application No. PCT/KR2017/003820 filed on Apr. 7, 2017, the entire contents of which are incorporated herein by reference.

BACKGROUND OF THE INVENTION

Technical Field

The present disclosure relates to a technology for synchronization in a MIMO system.

More specifically, the present disclosure relates to a technology of improving the overall beamforming synchronization performance by enabling beam tracking to be rapidly performed in a receiving device when synchronization is performed between a transmitting device and the receiving device in a MIMO system.

Background Art

In the beamforming technology, it is generally understood that each of a transmitting device and a receiving device includes a plurality of antennas.

There are various technologies performing communication based on a beamforming technology where an improvement of transmission capacity is expected proportional to the number of transmitting/receiving antennas without using additional frequency or power. The representative technology thereof is a Multiple Input Multiple Output (MIMO) technology.

In a communication system (hereinafter, MIMO system) using a MIMO technology, a transmission capacity gain can be most largely obtained from a diversity gain and a multiplexing gain through beamforming.

When a transmitting device and a receiving device communicate with each other on the basis of a beamforming technology, it is very important to select and synchronize optimum beams having the most excellent channel environment among various directions/types of antenna beams generable by the transmitting device and various directions/types of antenna beams generable by the receiving device However, a scheme of performing timing synchronization and beamforming synchronization between a transmitting device and a receiving device has not been specifically proposed in the current beamforming technology.

Therefore, it is necessary to perform beam tracking more rapidly by the receiving device thereby lowering the failure rate of beamforming synchronization between the transmitting device and the receiving device and improving the overall beamforming synchronization performance.

Accordingly, the present disclosure provides a method for enabling beam tracking to be rapidly performed in a receiving device to improve the overall beamforming synchronization performance.

SUMMARY OF THE INVENTION

An aspect of the present disclosure is to improve the overall beamforming synchronization performance by enabling beam tracking to be rapidly performed in a receiving device when timing synchronization and beamforming synchronization are performed between a transmitting device and the receiving device in a MIMO system.

Technical Solution

An apparatus for transmitting synchronization signal according to an embodiment of the present disclosure comprises: a timing synchronization performing unit configured to transmit, to a terminal, a first synchronization signal for frequency synchronization and a second synchronization signal for frame synchronization in order to perform timing synchronization; and a beamforming synchronization performing unit configured to transmit a third synchronization signal in different directions through a plurality of antennas to the terminal in order to perform beamforming synchronization.

Specifically, the apparatus for transmitting synchronization signal may further comprise a radio resource configuring unit configures a plurality of radio resource blocks, each of the plurality of radio resource blocks including two or more neighboring radio resource elements of radio resource elements included in a radio resource for synchronization, and the beamforming synchronization performing unit may transmit a beam synchronization signal, as the third synchronization signal, in different directions through antenna beams formed for each of the plurality of radio resource blocks, to perform beamforming synchronization based on the beam synchronization signal.

Specifically, the number of radio resource elements included in the radio resource block may be determined by the number of antenna beams being able to be generated by a receiving device receiving the beam synchronization signal.

Specifically, the receiving device may receive the beam synchronization signal through two or more antenna beams of different directions to perform beamforming synchronization based on the beam synchronization signal, and each of the two or more antenna beams may be generated by a combination of radio resource elements designated for each of the plurality of radio resource blocks.

Specifically, the radio resource may be a symbol among a plurality of symbols included in a downlink synchronization channel subframe periodically allocated, and the beamforming synchronization performing unit may transmit the beam synchronization signal in a direction different from that of a previous symbol for each of the plurality of radio resource blocks in each of the plurality of symbols.

Specifically, the radio resource configuring unit may configure an information transmitting block for transmitting information related to a communication system between the radio resource blocks, and information allocated to the information transmitting block may be transmitted through an antenna beam generated for one of two radio resource blocks neighboring the information transmitting block.

Specifically, the radio resource element may correspond to a minimum frequency element of a radio resource required for generating one antenna beam by the receiving device.

A method for transmitting a synchronization signal according to an embodiment of the present disclosure comprises: transmitting, to a terminal, a first synchronization signal for frequency synchronization and a second synchronization signal for frame synchronization in order to perform timing synchronization; and transmitting a third synchronization signal in different directions through a plurality of antennas to the terminal in order to perform beamforming synchronization.

Specifically, method for transmitting a synchronization signal may further comprises configuring a plurality of radio resource blocks, each of the plurality of radio resource blocks including two or more neighboring radio resource elements of radio resource elements included in a radio resource for synchronization, and the transmitting the third synchronization signal may comprise transmitting a beam synchronization signal in different directions through antenna beams formed for each of the plurality of radio resource blocks, to perform beamforming synchronization based on the beam synchronization signal.

Specifically, the receiving device may receive the beam synchronization signal through two or more antenna beams of different directions to perform beamforming synchronization based on the beam synchronization signal, and each of the two or more antenna beams may be generated for a combination of radio resource elements designated for each of the plurality of radio resource blocks.

Specifically, the radio resource may be a symbol among a plurality of symbols included in a downlink synchronization channel subframe periodically allocated, and the transmitting the third synchronization signal may comprise transmitting the beam synchronization signal in a direction different from that of a previous symbol for each of the plurality of radio resource blocks in each of the plurality of symbols.

A method for configuring a radio resource structure of a downlink synchronization channel according to an embodiment of the present disclosure comprises: configuring a plurality of radio resource blocks, each of the plurality of radio resource blocks including two or more neighboring radio resource elements of radio resource elements included in a radio resource of a downlink synchronization channel allocated at every preset period; and mapping each of the plurality of radio resource blocks to each of a plurality of transmitting antennas, to transmit a beam synchronization signal through antenna beams of different directions generated for each the plurality of radio resource blocks at each of the plurality of transmitting antennas.

Specifically, the method for configuring a radio resource structure of a downlink synchronization channel may further configuring an information transmitting block for transmitting information related to a communication system between the radio resource blocks, and mapping each of information transmitting blocks to a transmitting antenna mapped to one of radio resource blocks neighboring each of information transmitting blocks.

Specifically, the radio resource may comprise two beam synchronization frequency regions comprising the information transmitting block and the plurality of radio resource blocks for beamforming synchronization, and a timing synchronization frequency region comprising a radio resource block for timing synchronization, and the timing synchronization frequency region may be located between the two beam synchronization frequency regions.

Specifically, the number of radio resource elements included the radio resource block may be determined by the number of antenna beams being able to be generated by a receiving device receiving the beam synchronization signal.

A terminal for receiving synchronization signal according to an embodiment of the present disclosure comprises: a beamforming unit configured to generate two or more antenna beams of different directions through a plurality of antennas; a receiving unit configured to receive a synchronization signal through the two or more antenna beams; and a synchronization performing unit configured to perform beamforming synchronization based on the synchronization signal.

Specifically, the beamforming unit may configure a plurality of radio resource blocks, each of the plurality of radio resource blocks including two or more neighboring radio resource elements of radio resource elements included in a radio resource for synchronization and generate the two or more antenna beams by a combination of radio resource elements included in each of the plurality of radio resource blocks.

Specifically, the radio resource may include an information transmitting block for transmitting information related to a communication system between the radio resource blocks.

A method for receiving synchronization signal according to an embodiment of the present disclosure comprises: generating two or more antenna beams of different directions through a plurality of antennas; receiving a synchronization signal through the two or more antenna beams; and performing beamforming synchronization based on the synchronization signal.

Specifically, the generating two or more antenna beams may comprise configuring a plurality of radio resource blocks, each of the plurality of radio resource blocks including two or more neighboring radio resource elements of radio resource elements included in a radio resource for synchronization and generating the two or more antenna beams by a combination of radio resource elements included in each of the plurality of radio resource blocks.

According to the present disclosure, when synchronization is performed between a transmitting and a receiving device in a MIMO system, the receiving device can rapidly perform beam tracking, thereby improving the overall beamforming synchronization performance.

DETAILED DESCRIPTION OF THE EXEMPLARY EMBODIMENTS

Figure 1:
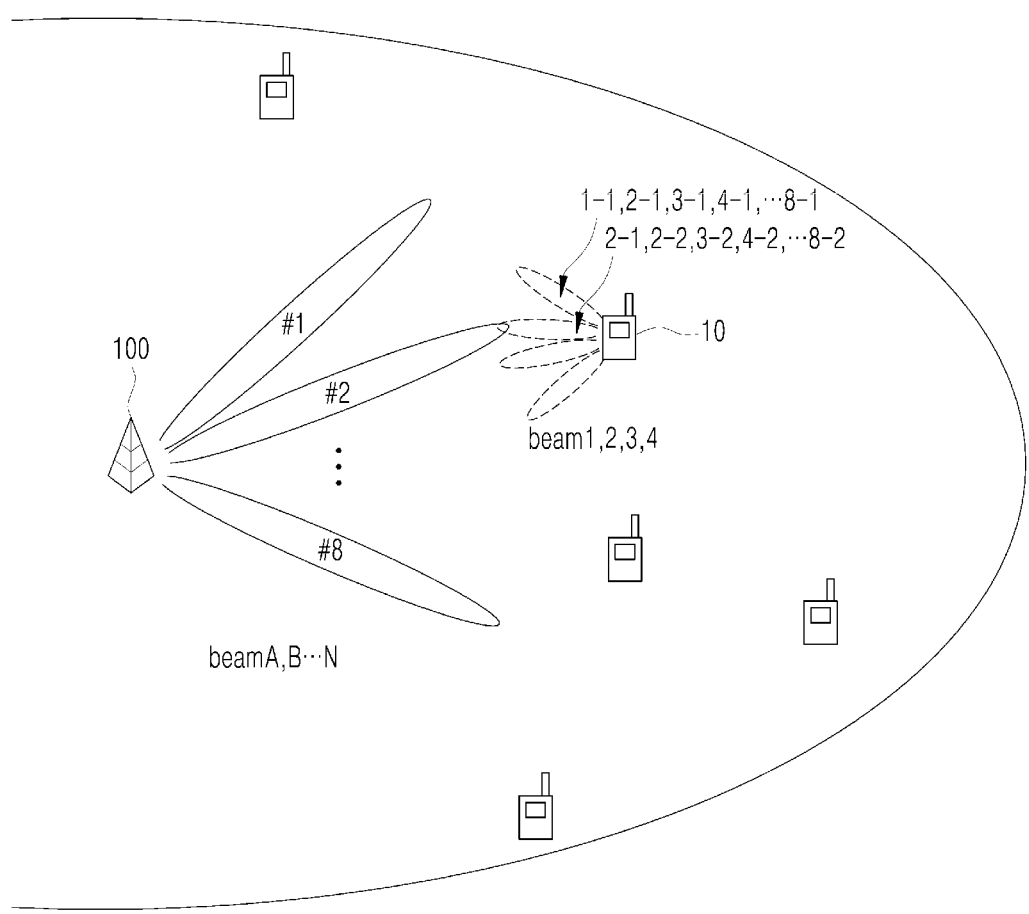
FIG. 1 is a diagram showing an example of a MIMO system to which the present disclosure is applied.

It should be noted that technical terms used in the present specification are merely for the purpose of describing particular embodiments and are not intended to limit the scope of the present disclosure. In addition, the technical terms used in the present specification should be interpreted in a meaning generally understood by a person skilled in the technical field to which the present disclosure belongs unless defined as a particular other meaning in the present specification, and should not be interpreted in an excessively expansive meaning, or an excessively reduced meaning. In addition, if technical terms used herein are erroneous and fail to accurately express the technical idea of the present disclosure, they should be replaced with technical terms that allow a person skilled in the art to properly understand. In addition, the general terms used herein should be interpreted according to the definitions in the dictionary or in the context and should not be interpreted as an excessively contracted meaning.

Furthermore, a singular form used in the present specification includes a plural form unless contextual meanings of the singular form and the plural form are clearly different. In the present specification, the term "include", "comprise", or the like should not be interpreted in necessarily including all the various elements or operations disclosed in the specification. Further, the terms should be interpreted in that a part of the elements or a part of the operations may not be included, or additional elements or operations may be further included.

In addition, the terms including an ordinal number, such as first, and second, used in the present disclosure may be used for explaining various elements. However, the elements are not limited to the terms. The terms are only used for the purpose of discriminating one element from a different element. For example, a first element may be termed a second element, and similarly, a second element may be termed a first element without departing from the scope of the present disclosure.

The embodiments disclosed in the present specification will be explained in detail by referring to the attached drawings. Regardless of reference drawing signs, the same or similar elements will have the same reference numbers and redundant explanation thereon will be omitted.

Besides, if the detailed explanation on the related prior art in describing the present disclosure is to obscure the substance of the present disclosure, the detailed explanation thereon will be omitted. In addition, it must be noted that the attached drawings are provided only to make the technical ideas disclosed herein understood more easily and they cannot be interpreted to limit the technical ideas.

Hereinafter, embodiments of the present disclosure will be described in detail with reference to the accompanying drawings. In relation to the addition of reference numerals to elements of each drawing, it should be noted that the same reference numerals designate the same elements where possible although they are shown in different drawings. Further, in the following description, a detailed description of related known functions and configurations will be omitted when the description is determined to obscure the substance of the present disclosure.

Hereinafter, an embodiment of the present disclosure will be described with reference to the accompanying drawings.

FIG. 1 is a diagram showing an example of a MIMO system according to the present disclosure.

A Multiple Input Multiple Output (MIMO) technology is a technology where a transmission capacity gain is expected proportional to the number of transmitting antennas and the number of receiving antennas without using additional frequency or power. In the above MIMO technology, a transmission capacity gain can be most largely obtained from a diversity gain and a multiplexing gain through beamforming.

A beamforming technology used by a MIMO system is divided into digital beamforming, analog beamforming, and hybrid beamforming.

A plurality of beams generated by a digital beamforming technique may be used for improving the diversity of a receiving terminal to increase the quality (Signal to Interference Noise Ratio, SINR) of a signal and may also be used for multiplexing allowing that a plurality of receiving terminals are divided by means of different beams to receive different signals.

However, because the number of beams generated by a digital beamforming technique is determined by the number of RF chains, the installation cost may be increased.

Meanwhile, a plurality of beams generated by an analog beamforming technique is restrictively used only for improving the diversity of a receiving terminal to improve a signal quality (SINR).

Finally, because of the disadvantages of a digital beamforming technique requiring high installation cost and an analog beamforming technique having limited performance gain, a MIMO system mainly uses a hybrid beamforming technique in which the above beamforming techniques are combined.

Accordingly, hereinafter, a hybrid beamforming technique will be referred to in the present disclosure.

As illustrated in FIG. 1, in a MIMO system using a beamforming technology such as a hybrid beamforming technique, to which the present disclosure is applied, it is very important between a transmitting device and a receiving device to select and synchronize optimum beams having the most excellent channel environment, among various directions/types of antenna beams generable by the transmitting device and various directions/types of antenna beams generable by the receiving device.

The transmitting device corresponds to a base station 100 illustrated in FIG. 1, and the receiving device corresponds to each of terminals illustrated in FIG. 1.

Therefore, in the following description, a transmitting device, which is configured to transmit a synchronization signal for timing synchronization and beamforming synchronization, will be collectively referred to as a base station 100, and a receiving device, which is configured to receive the synchronization signal, will be collectively referred to as a terminal 10.

A transmitting device, i.e. the base station 100, has a plurality of antennas. A receiving device, i.e. the terminal 10 has two or more antennas.

An apparatus for transmitting synchronization signal proposed in the present disclosure is configured to transmit, to a terminal, a first synchronization signal for frequency synchronization and a second synchronization signal for frame synchronization in order to perform timing synchronization.

The apparatus for transmitting synchronization signal proposed in the present disclosure is configured to transmit a third synchronization signal (hereinafter, beam synchronization signal) through a plurality of antennas to a terminal in different directions in order to perform beamforming synchronization.

Specifically, the apparatus for transmitting synchronization signal proposed in the present disclosure is configured to perform beamforming synchronization based on a beam synchronization signal by configuring a plurality of radio resource blocks and transmitting the beam synchronization signal in different directions through antenna beams generated for each of the plurality of radio resource blocks. Each of the plurality of radio resource blocks includes two or more neighboring radio resource elements of radio resource elements included in a radio resource designated for synchronization between a transmitting and a receiving device, i.e. the base station 100 and the terminal 10.

The apparatus for transmitting synchronization signal according to the present disclosure may be identical to a device that performs timing synchronization and beamforming synchronization among a transmitting device and a receiving device, i.e. the base station 100 and the terminal 10. Hereinafter, the apparatus for transmitting synchronization signal will be described as being identical to the base station 100.

The base station 100, as an apparatus for transmitting synchronization signal proposed in the present disclosure, may configure a plurality of radio resource blocks. Each a plurality of radio resource blocks includes neighboring radio resource elements of radio resource elements in a radio resource designated for synchronization between the devices.

Then, the base station 100 may generate antenna beams of different directions for each of the plurality of radio resource blocks through a plurality of antennas included in the base station 100.

Accordingly, the base station 100 may perform beamforming synchronization with the terminal 10 by transmitting a beam synchronization signal through antenna beams of different directions generated for each of the plurality of radio resource blocks.

The number of radio resource elements included in each of the radio resource blocks configured by the base station 100 may be determined by the number of antenna beams generable by a receiving device, i.e. the terminal 10 receiving a beam synchronization signal.

The terminal 10 is configured to generate antenna beams having different directions through each of two or more antennas included in the terminal 10.

Accordingly, the terminal 10 may perform beam synchronization signal-based beamforming synchronization with the base station 100 by receiving a beam synchronization signal through two or more antenna beams of different directions.

Each of the two or more antenna beams generated by the terminal 10 may be generated by using a combination of radio resource elements designated for each of the above plurality of radio resource blocks in a radio resource designated for synchronization between the devices.

When beamforming synchronization between the base station 100 and the terminal 10 is performed based on beam synchronization signal using the above described scheme, the receiving device, i.e. the terminal 10 can rapidly perform beam tracking during the beamforming synchronization, thereby lowering a failure rate of the beamforming synchronization and improving the overall beamforming synchronization performance.

Hereinafter, a synchronizing method proposed in the present disclosure will be further specifically described, thereby describing a procedure in which the above effects are derived.

Figure 2:
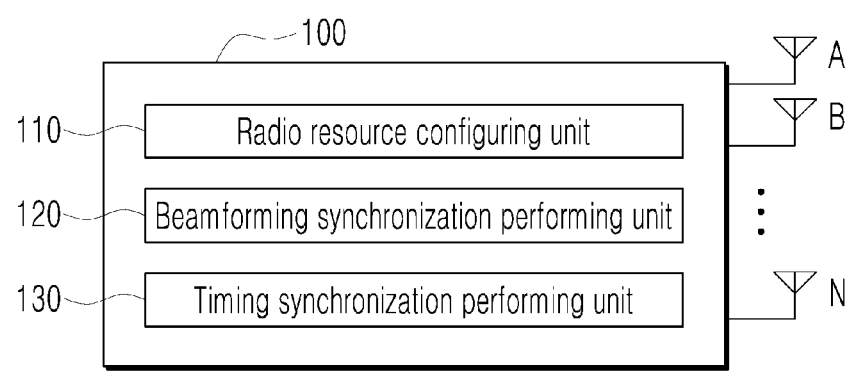
FIG. 2 is a diagram of an example of the configuration of an apparatus for transmitting synchronization signal according to an embodiment of the present disclosure.

As illustrated in FIG. 2, an apparatus for transmitting synchronization signal 100 according to an embodiment of the present disclosure includes: a timing synchronization performing unit 130 configured to transmit a first synchronization signal for frequency synchronization and a second synchronization signal for frame synchronization to a terminal in order to perform timing synchronization; and a beamforming synchronization performing unit 120 configured to transmit a third synchronization signal in different directions through a plurality of antennas to a terminal in order to perform beamforming synchronization.

In addition, the apparatus for transmitting synchronization signal 100 may further include a radio resource configuring unit 110 configured to configure a plurality of radio resource blocks each including two or more neighboring radio resource elements of radio resource elements in a radio resource designated for synchronization between the devices.

In the following description, the base station 100 will be referred to as an apparatus for transmitting synchronization signal of the present disclosure.

The apparatus for transmitting synchronization signal 100, i.e. the base station 100, of the present disclosure includes a plurality of antennas A, B, . . . , N. For convenience of explanation, the base station 100 is assumed to have eight antennas in the following description.

The radio resource configuring unit 110 is configured to configure a plurality of radio resource blocks each including two or more neighboring radio resource elements of radio resource elements in a radio resource designated for inter-device synchronization.

The above mentioned radio resource designated for inter-device synchronization implies one symbol among a plurality of symbols in a downlink synchronization channel subframe which is allocated periodically.

Specifically, in a MIMO system, a synchronization signal for inter-device timing synchronization and beamforming synchronization is periodically transmitted through a downlink synchronization channel.

Figure 3:
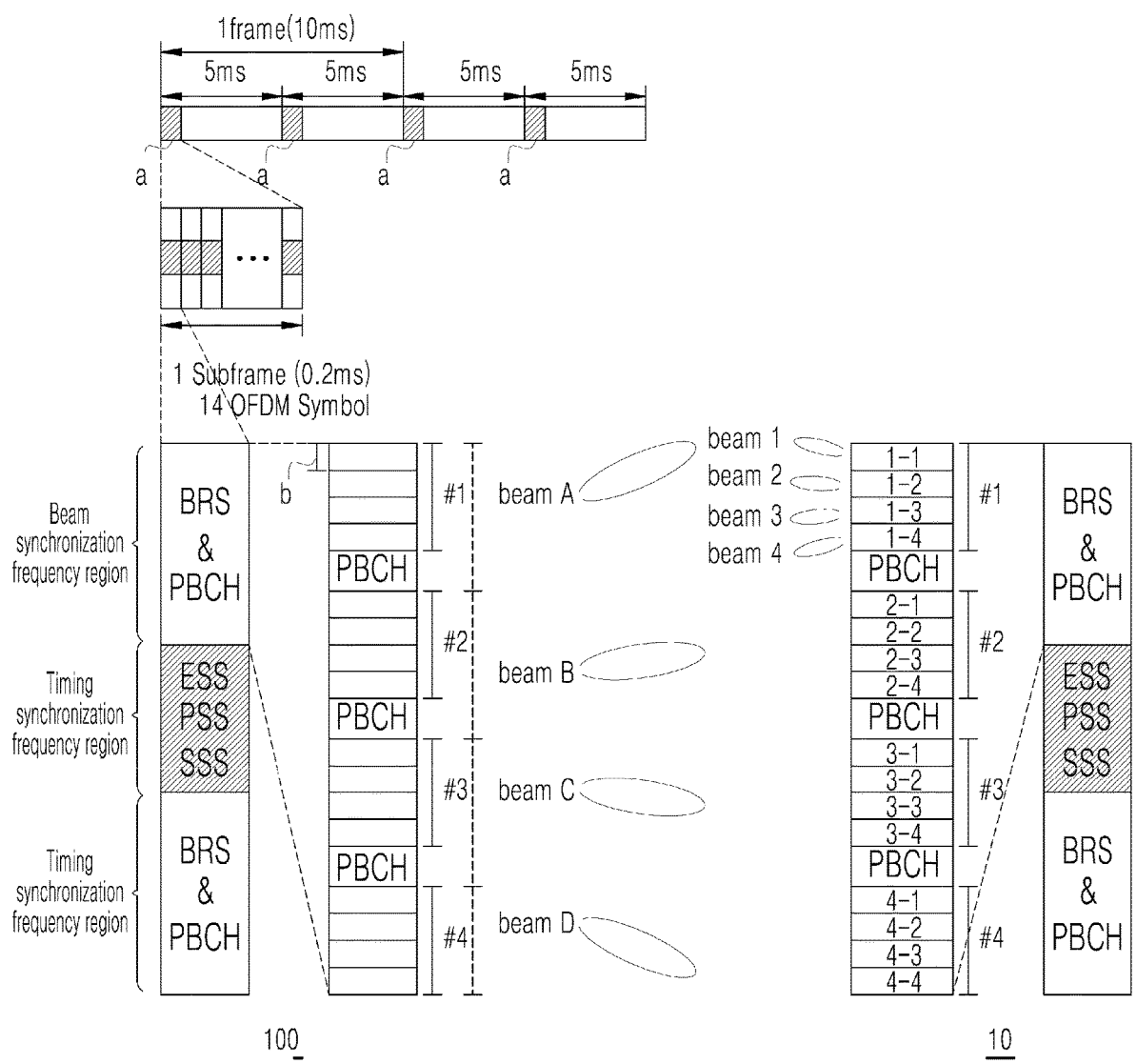
FIGS. 3 and 5 are diagrams of examples of the structure of a radio resource of a downlink synchronization channel according to the embodiments of the present disclosure.

For example, as illustrated in FIG. 3, subframes (0, 25) at designated locations for each of frames (e.g. subframes 0-49, 10 ms) in a downlink synchronization channel may be allocated as subframes (a) for inter-device synchronization.

Then, in a MIMO system, a synchronization signal for inter-device synchronization may be periodically transmitted by the interval of 5 ms through the downlink synchronization channel.

Hereinafter, a subframe (a) for inter-device synchronization will be named a synchronization subframe.

As illustrated in FIG. 3, a synchronization subframe (a) is configured by a plurality of symbols, e.g. 14 OFDM symbols.

Hereinafter, it will be described in detail that the radio resource configuring unit 110 configures a structure of a radio resource (OFDM symbol in a synchronization subframe) of a downlink synchronization channel.

The radio resource configuring unit 110 may divide (configure) a radio resource designated for inter-device synchronization, i.e. the radio resource of an OFDM symbol in a synchronization subframe (a), into a timing synchronization frequency region for timing synchronization and a beam synchronization frequency region for beamforming synchronization.

The timing synchronization performing unit 130 may perform timing synchronization by transmitting a first synchronization signal for frequency synchronization and a second synchronization signal for frame synchronization through a plurality of antenna beams generated in the timing synchronization frequency region.

The first synchronization signal may be a Primary Sync Signal (PSS), and the second synchronization signal may be a Secondary Sync Signal (SSS). In addition, the timing synchronization performing unit 130 may transmit (transfer) further more synchronization signals, such as an Enhanced Sync Signal (ESS), in order to perform timing synchronization.

Meanwhile, the beamforming synchronization performing unit 120 is configured to perform beamforming synchronization by transmitting a third synchronization signal for beamforming synchronization through a plurality of antenna beams generated in the beam synchronization frequency region.

The third synchronization signal may be a beam synchronization signal, specifically, a Beam Reference Signal (BRS).

Hereinafter, a beam synchronization frequency region in a radio resource (OFDM symbol in a synchronization subframe) of a downlink synchronization channel will be described in detail.

The radio resource configuring unit 110 is configured to divide a radio resource designated for inter-device synchronization by a particular radio resource element. The radio resource may be one OFDM symbol of OFDM symbols in a synchronization subframe (a) of a downlink synchronization channel, which is periodically allocated.

The particular radio resource element may correspond to a minimum frequency unit of a radio resource required for generating one antenna beam by a receiving device, i.e. the terminal 10.

The particular radio element may be defined with reference to a Radio Block (RB), and may be defined with reference to a carrier included in an RB.

For convenience of explanation, a particular radio resource element is assumed to be one RB in the following description.

In the above case, the radio resource configuring unit 110 may divide, by the unit of one RB, the radio resource of an OFDM symbol of OFDM symbols in a synchronization subframe (a) of a downlink synchronization channel, which is periodically allocated.

Accordingly, the radio resource of the OFDM symbol in the synchronization subframe (a) of the synchronization channel may be divided into multiple radio resource elements in units of RBs.

Then, the radio resource configuring unit 110 may configure a plurality of radio resource blocks each including two or more neighboring radio resource elements of a plurality of radio resource elements. The plurality of radio resource elements is in unit of one RB and included in the OFDM symbol of the synchronization subframe (a) of the downlink synchronization channel.

The number of radio resource elements configuring each of radio resource blocks may be determined by the number of antenna beams generable by a receiving device, i.e. the terminal 10 configured to receive a beam synchronization signal, i.e. BRS.

For example, it is assumed that the terminal 10 has four antennas and thus can generate four antenna beams.

The apparatus for transmitting synchronization signal 100, i.e. the base station 100, may already have identified that the terminal 10 has four antennas, through the procedure for performing the previous beamforming synchronization or through the procedure for transmitting and receiving information on the basis of an uplink control channel.

In the above case, the radio resource configuring unit 110 may configure a plurality of radio resource blocks each generated by combining four (or 8, or 12, etc. a number related to 4) neighboring radio resource elements of a plurality of radio resource elements in the OFDM symbol in the synchronization subframe (a) of the downlink synchronization channel.

Meanwhile, when the apparatus for transmitting synchronization signal 100, i.e. the base station 100 has failed to identify that the terminal 10 has four antennas, the radio resource configuring unit 110 may configure a plurality of radio resource blocks each having N number (pre-configured estimation number, the number of antennas of a terminal which has the most largest number of antennas among commercialized terminals) of neighboring radio resource elements of a plurality of radio resource elements included in the OFDM symbol in the synchronization subframe (a) of the downlink synchronization channel.

For convenience of explanation, the embodiment of configuring a plurality of radio resource blocks each generated by combining four neighboring radio resource elements will be described in the following description.

In addition, the radio resource configuring unit 110 may configure a plurality of radio resource blocks, as described above, in an OFDM symbol in a synchronization subframe (a) of a downlink synchronization channel. The number of the plurality of radio resource blocks may be as the same as the number of antennas included in the base station 100, in other words, the number of antenna beams generable by the base station 100.

Hereinafter, the radio resource configuring unit 110 is assumed to configure eight radio resource blocks in an OFDM symbol in a synchronization subframe (a) of a downlink synchronization channel.

Accordingly, the radio resource configuring unit 110 may configure eight radio resource blocks each having four neighboring radio resource elements in the OFDM symbol in the synchronization subframe (a) of the downlink synchronization channel.

The number of radio resource elements in a radio resource block follows the number of antennas of a receiving device, i.e. the terminal (10). Therefore, the smaller the number of antennas of the terminal 10, the smaller the number of radio resource elements configuring a radio resource block, and the greater the number of antennas of the terminal 10, the greater the number of radio resource elements configuring the same.

Therefore, it is also possible for the radio resource configuring unit 110 to identify the number of antennas of all terminals (mobile phone, notebook, etc.) existing in the cell coverage of the base station 100, and flexibly adjust the number of radio resource elements in a radio resource block according to a result obtained by applying the minimum number of terminal antennas, the maximum number of terminal antennas, or the minimum and maximum number of terminal antennas to a separately defined algorithm.

In addition, the radio resource configuring unit 110 may map each of the plurality of radio resource blocks, i.e. eight radio resource blocks to each of the plurality of transmitting antennas, i.e. eight antennas included in the base station 100, so as to allow eight antennas to generate antenna beams of different directions for eight radio resource blocks.

Meanwhile, in the present disclosure, a radio resource designated for inter-device synchronization, i.e. the radio resource of an OFDM symbol in a synchronization subframe (a) is divided into (configured by) a timing synchronization frequency region for timing synchronization and a beam synchronization frequency region for beamforming synchronization. As illustrated in FIG. 3, the radio resource of an OFDM symbol in a synchronization subframe (a) may include two beam synchronization frequency regions and a timing synchronization frequency region located between the two beam synchronization frequency regions.

In the above case, the radio resource configuring unit 110 may configure eight radio resource blocks each including four neighboring radio resource elements in an OFDM symbol in a synchronization subframe (a) of a downlink synchronization channel. In one region of two beam synchronization frequency regions, four radio resource blocks #1,#2,#3, and #4 may be configured, and in the remaining one region, the remaining four radio resource blocks #5,#6, #7, and #8 may be configured.

For convenience, only four radio resource blocks #1,#2, #3, and #4 are illustrated in FIG. 3.

In addition, the radio resource configuring unit 110 may configure an information transmitting block (hereinafter, Physical Broadcasting Channel, PBCH) configured to transmit information relating to a communication system, e.g. a Master Information Block (MIN) and a System Information Block (SIB), and the information transmitting block may be located between the radio resource blocks configured as described above.

When an information transmitting block, i.e. PBCH is located between the radio resource blocks, the information transmitting block, i.e. PBCH, belongs to a beam synchronization frequency region.

Accordingly, as illustrated in FIG. 3, the radio resource of an OFDM symbol in a synchronization subframe (a) of a downlink synchronization channel includes a beam synchronization frequency region including radio resource blocks #1,#2,#3, and #4 each including four radio resource elements (b), a PBCH between the radio resource blocks #1 and #2, a PBCH between the radio resource blocks #2 and #3, and a PBCH between the radio resource blocks #3 and #4, and a timing synchronization frequency region for timing synchronization.

Although the following description is omitted in FIG. 3, the radio resource of the OFDM symbol in the synchronization subframe (a) of the downlink synchronization channel also includes a beam synchronization frequency region including radio resource blocks #5,#6,#7, and #8 each including four radio resource elements (b), a PBCH between the radio resource blocks #5 and #6, a PBCH between the radio resource blocks #6 and #7, and a PBCH between the radio resource blocks #7 and #8.

The timing synchronization performing unit 130 is configured to perform timing synchronization by transmitting synchronization signals, i.e. PSS, SSS, and ESS, for timing synchronization through a plurality of antenna beams generated in the timing synchronization frequency region.

That is, the base station 100 may generate a plurality of antenna beams toward all directions in the cell coverage of the base station 100 through each of eight antennas included in the base station.

Then, the timing synchronization performing unit 130 may perform timing synchronization with the terminal 10 by transmitting synchronization signals, i.e. PSS, SSS, and ESS, for timing synchronization through a plurality of antenna beams toward the entire regions in the cell coverage of the base station 100. The plurality of antenna beams are generated in the timing synchronization frequency region.

The beamforming synchronization performing unit 120 is configured to perform BRS-based beamforming synchronization by transmitting a beam synchronization signal, i.e. a BRS, through antenna beams of different directions generated for each of the plurality of radio resource blocks #1-#8.

That is, the base station 100 may generate antenna beams of different directions through the eight antennas included in the base station 100, each of eight antennas is mapped to each of the eight radio resource blocks #1-#8.

The beamforming synchronization performing unit 120 may perform BRS-based beamforming synchronization with the terminal 10 by transmitting a BRS through antenna beams A, B, C, D, . . . , H of different directions generated for the eight radio resource blocks #1-#8.

That is, the base station 100 of the present disclosure may generate as many antenna beams A, B, C, D, . . . , H as the number of antennas included in the base station. In view of each of the antenna beams, one antenna beam is generated by binding four neighboring radio resource elements in one radio resource block.

Then, the base station 100 may generate an antenna beam through eight antennas having a direction different from that of the previous OFDM symbol for each of eight radio resource blocks #1~#8 in each of OFDM symbols in the synchronization subframe (a) of the downlink synchronization channel.

The beamforming synchronization performing unit 120 may transmit a BRS in a direction different from that of the previous OFDM symbol for each of eight radio resource blocks #1~#8 in each of OFDM symbols in the synchronization subframe (a) of the downlink synchronization channel.

Meanwhile, information, e.g. MIB and SIM, allocated for a PBCH may be transmitted through an antenna beam generated in one of two radio resource blocks neighboring the PBCH.

To this end, the radio resource configuring unit 110 is configured to map each of PBCHs to an antenna, i.e. a transmitting antenna, of the base station 100, to which one of two radio resource blocks neighboring the each of PBCHs is mapped.

For example, when a PBCH is located between the radio resource blocks #1 and #2, the information included in the PBCH may be transmitted through an antenna beam generated in one of the two radio resource blocks #1 and #2 neighboring the PBCH.

To this end, when a PBCH is located between the radio resource blocks #1 and #2, the radio resource configuring unit 110 may map the PBCH to an antenna of the base station 100, to which one of the two radio resource blocks #1 and #2 is mapped.

Therefore, when the transmission of a previous radio resource block of two radio resource blocks neighboring a PBCH is pre-defined, as illustrated in FIG. 3, the information in a PBCH between the radio resource blocks #1 and #2 may be transmitted through an antenna beam A identical to that of the radio resource block #1, the information in a PBCH between the radio resource blocks #2 and #3 may be transmitted through an antenna beam B identical to that of the radio resource block #2, and the information in a PBCH between the radio resource blocks #3 and #4 may be transmitted through an antenna beam C identical to that of the radio resource block #3.

For the radio resource of an OFDM symbol in a synchronization subframe (a) of a downlink synchronization channel, when information, i.e. MIB and SIM, relating to a communication system, is interleaved between radio resource blocks, the same MIB and SIM can be simultaneously transmitted through multiple antenna beams A, B, C, D, E, F, and G. Therefore, a frequency diversity gain through beamforming can be obtained.

A receiving device, i.e. the terminal 10, is configured to generate antenna beams having different direction through two or more antennas included in the terminal 10, respectively.

Hereinafter, the terminal 10 is assumed to have four antennas and thus generate four antenna beams of different directions.

Accordingly, the terminal 10 may be configured to perform BRS-based beamforming synchronization with the base station 100 by receiving a beam synchronization signal, i.e. BRS, through four antenna beams generated to have different directions.

It is important that the terminal 10 may generate each of four antenna beams generated by using a combination of radio resource elements designated for the above plurality of radio resource blocks in a radio resource designated for inter-device synchronization.

That is, the terminal 10 may generate antenna beams 1, 2, 3, and 4 for each of four antennas by using a combination of radio resource elements designated for a plurality of radio resource blocks #1-#8 in the radio resource of an OFDM symbol in a synchronization subframe (a) of a downlink synchronization channel.

The scheme of designating a radio resource element of each of radio resource blocks for each of antennas in the receiving device may be a random scheme or a sequential scheme.

In FIG. 3, the case of sequentially designating a radio resource element of each of radio resource blocks for each of antennas in a receiving device is illustrated.

In the case of the radio resource block #1 of FIG. 3, the terminal 10 may use a sequentially designated radio resource element 1-1 of the radio resource block #1 in order to make an antenna beam 1, a sequentially designated radio resource element 1-2 of the radio resource block #1 in order to make an antenna beam 2, a sequentially designated radio resource element 1-3 of the radio resource block #1 in order to make an antenna beam 3, and a sequentially designated radio resource element 1-4 of the radio resource block #1 in order to make an antenna beam 4.

Accordingly, the terminal 10 may make the antenna beam 1 by using a combination of the radio resource element 1-1 of the radio resource block #1, a radio resource element 2-1 of the radio resource block #2, a radio resource element 3-1 of the radio resource block #3, a radio resource element 4-1 of the radio resource block #4, a radio resource element 5-1 of the radio resource block #5, a radio resource element 6-1 of the radio resource block #6, a radio resource element 7-1 of the radio resource block #7, and a radio resource element 8-1 of the radio resource block #8. As described above, the terminal 10 may be configured to perform BRS-based beamforming synchronization with the base station 100 by forming antenna beams 1, 2, 3, and 4 of different directions and receiving a BRS through the four antenna beams 1, 2, 3, and 4.

That is, the terminal 10 of the present disclosure may generate as many antenna beams 1, 2, 3 and 4 as the number of antennas included in the terminal. In view of each of the antenna beams, one antenna beam is generated by binding eight radio resource elements from each of eight radio resource blocks.

The terminal 10 may repeatedly perform a series of beam tracking procedures of measuring a Signal-to-Interference-plus-Noise Ratio (SINR) of a beam synchronization signal, i.e. BRS, for each of antenna beams A, B, C, D, . . . , H of the base station 100, which is received by each of antenna beams 1, 2, 3 and 4 generated by the terminal, for each of OFDM symbols in a synchronization subframe (a) of a downlink synchronization channel and reporting a result from the measurement to the base station 100.

The base station 100 may determine an optimum beam (a pair of a beam of the base station 100 and a beam of the terminal 10) having the most excellent SINR, on the basis of information reported from the terminal 10, thereby performing beamforming synchronization based on a beam synchronization signal BRS between the base station 100 and the terminal 10.

It is also possible for the base station 100 to determine other beam (e.g. secondary ranked beam, tertiary ranked beam) in addition to an optimum beam having the most excellent SINR with respect to the terminal 10 and store information related to the other beam. Accordingly, when the communication quality of the previously determined optimum beam deteriorates before beamforming synchronization is re-performed, the base station 100 can use the other beam (e.g. secondary ranked beam, tertiary ranked beam) during communication with the terminal 10 by utilizing the stored information related to the other beam.

Meanwhile, as illustrated in FIG. 3, the terminal 10 may randomly use each of PBCHs interleaved between radio resource blocks in order to form antenna beams 1, 2, 3, and 4, or may sequentially use each of PBCHs in order to form antenna beams 1, 2, 3, and 4.

For example, in the case where PBCHS are sequentially used, the terminal 10 may use a PBCH between the radio resource blocks #1 and #2 in order to form an antenna beam 1, a PBCH between the radio resource blocks #2 and #3 in order to form an antenna beam 2, a PBCH between the radio resource blocks #3 and #4 in order to form an antenna beam 3, a PBCH between the radio resource blocks #5 and #6 in order to form an antenna beam 4, a PBCH between the radio resource blocks #6 and #7 in order to form an antenna beam 1, and a PBCH between the radio resource blocks #7 and #8 in order to form an antenna beam 2, in a first OFDM symbol.

In a next OFDM symbol, the terminal 10 may use a PBCH between the radio resource blocks #1 and #2 in order to form an antenna beam 3, a PBCH between the radio resource blocks #2 and #3 in order to form an antenna beam 4, a PBCH between the radio resource blocks #3 and #4 in order to form an antenna beam 1, a PBCH between the radio resource blocks #5 and #6 in order to form an antenna beam 2, a PBCH between the radio resource blocks #6 and #7 in order to form an antenna beam 3, and a PBCH between the radio resource blocks #7 and #8 in order to form an antenna beam 4.

In the radio resource of an OFDM symbol in a synchronization subframe (a) of a downlink synchronization channel, when information, i.e. MIB and SIM, relating to a communication system, is interleaved between radio resource blocks, the same MIB and SIM can be simultaneously received through multiple antenna beams 1, 2, 3, and 4. Therefore, a frequency diversity gain through beamforming can be obtained.

As described above, the base station 100 of the present disclosure may generate antenna beams A, B, C, D, . . . , H as the number of antennas included in the base station and perform beamforming synchronization on the basis of a radio resource structure (OFDM symbol in a synchronization subframe) of a downlink synchronization channel where the same antenna beam is generated by binding two or more (e.g. four) neighboring radio resource elements in one radio resource block.

In the present disclosure, the terminal 10 may generate antenna beams 1, 2, 3, and 4 as the number of antennas included in the terminal and perform beamforming synchronization on the basis of a radio resource structure (OFDM symbol in a synchronization subframe) of a downlink synchronization channel where the same antenna beam is generated by binding multiple (e.g. eight) radio resource elements each designated for each of multiple (e.g. eight) radio resource blocks.

As described above, when beamforming synchronization is performed on the basis of a radio resource structure of a downlink synchronization channel according to the present disclosure, a receiving device, i.e. the terminal 10 can rapidly perform beam tracking in a synchronization procedure, thereby reducing the failure of beamforming synchronization due to the failure in tracking an optimum beam.

Consequently, according to the present disclosure, during timing synchronization and beamforming synchronization between the base station 100 and the terminal 10, beam tracking can be rapidly performed in the terminal 10, so that the overall beamforming synchronization performance can be improved.

Meanwhile, FIG. 3 illustrates an embodiment of utilizing the frequency domain where the base station 100 is configured to generate one antenna beam by binding frequency radio resource elements, and the terminal 10 is configured to generate an antenna beam for each of frequency radio resource elements within each of antenna beams transmitted by the base station 100, so that the terminal 10 may receive the same beam synchronization signal (e.g. BRS of antenna beam A) from the base station 100 through multiple antenna beams (e.g. antenna beams 1, 2, 3, and 4).

Figure 5:
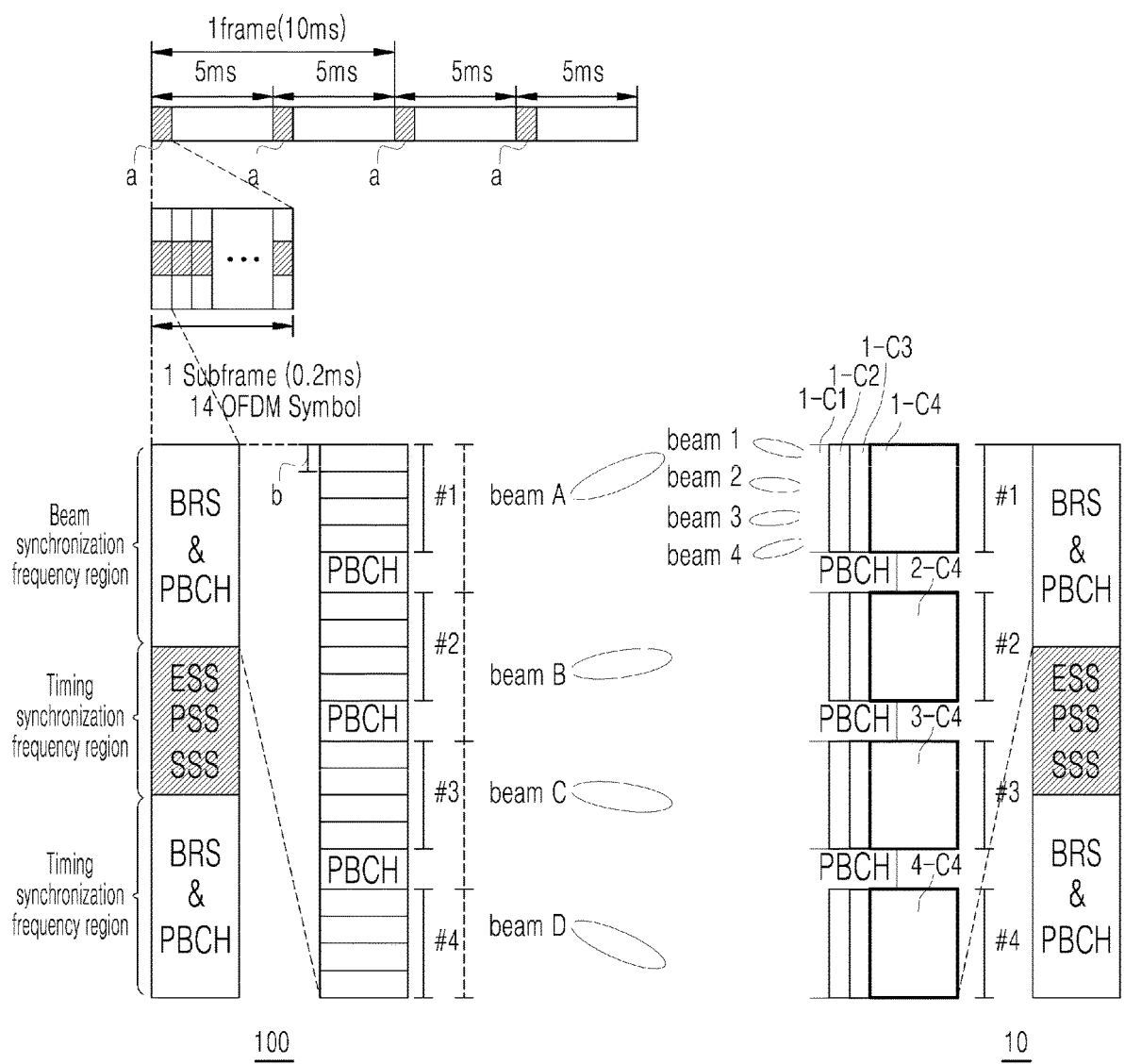

However, in the present disclosure, as illustrated in FIG. 5, the same beamforming synchronization performance can be obtained through an embodiment of the scheme of utilizing a code domain (division).

That is, under the assumption that the terminal 10 has four antennas, the base station 100 may generate one antenna beam on the basis of different four codes (e.g. $c_1$, $c_2$, $c_3$, and $c_4$).

As illustrated in FIG. 5, when the base station 100 forms antenna beams A, B, C, and D in the radio resource blocks #1,#2,#3, and #4, respectively, each of the antenna beams may be formed on the basis of different four codes (e.g. $c_1$, $c_2$, $c_3$, and $c_4$).

Then, the terminal 10 may form each of antenna beams in each of radio resource blocks identical to those of the antenna beams transmitted by the base station 100 and receive a signal on the basis of different four codes (e.g. $c_1$, $c_2$, $c_3$, and $c_4$) through each of antenna beams of the terminal 10.

As illustrated in FIG. 5, when the base station 100 transmits antenna beam A, the terminal 10 may receive a BRS of the antenna beam A from code division resources 1-C1,1-C2,1-C3, and 1-C4 based on four codes (e.g. $c_1$, $c_2$, $c_3$, and $c_4$) through antenna beams 1, 2, 3, and 4 of the terminal in the radio resource block #1 corresponding to the antenna beam A.

Accordingly, the terminal 10 may receive BRSs of antenna beams A, B, C . . . , H from the base station 100, through antenna beam 1, from code division resources 1-C1,2-C1,3-C1,4-C1,5-C1,6-C1,7-C1, and 8-C1 based on code $c_1$, respectively.

Hereafter, a method for transmitting synchronization signal according to an embodiment of the present disclosure will be described in detail with reference to FIG. 4.

For convenience of explanation, an apparatus for transmitting synchronization signal will be referred to as the base station 100 so as to match the above description.

In a method for transmitting a synchronization signal by the base station 100 according to the present disclosure, when a pre-configured period starts (S100), an inter-device synchronization is initiated.

The pre-configured period starts at a time point at which a synchronization subframe (a) of a downlink synchronization channel is transmitted, as described above with reference to FIG. 3. The synchronization subframe (a) of a downlink synchronization channel is periodically allocated.

In the method for transmitting a synchronization signal by the base station 100 according to the present disclosure, when the pre-configured period starts (S100), the radio resource of an OFDM symbol in the synchronization subframe (a) of the downlink synchronization channel may be divided into (configured by) a timing synchronization frequency region for timing synchronization and a beam synchronization frequency region for beamforming synchronization (S105).

Then, in the method for transmitting a synchronization signal by the base station 100 according to the present disclosure, in the beam synchronization frequency region in the OFDM symbol in the synchronization subframe (a) of the downlink synchronization channel, a plurality of radio resource blocks each including two neighboring radio resource elements of radio resource elements may be configured (S110).

In the method for transmitting a synchronization signal by the base station 100 according to the present disclosure, when the above example is assumed, eight radio resource blocks each including four neighboring radio resource elements of a plurality of radio resource elements in the unit of one RB may be configured in the OFDM symbol in the synchronization subframe (a) of the downlink synchronization channel.

Then, in the method for transmitting a synchronization signal by the base station 100 according to the present disclosure, eight radio resource blocks may be mapped to eight antennas included in the base station 100, respectively, thereby forming antenna beams of different directions for each of eight radio resource blocks in eight antennas.

In the method for transmitting a synchronization signal by the base station 100 according to the present disclosure, it is also possible to: previously configure and map, before the operation S100, eight radio resource blocks each including four neighboring radio resource elements of a plurality of radio resource elements in the unit of one RB in the OFDM symbol in the synchronization subframe (a) of the downlink synchronization channel; and when the pre-configured period starts (S100), only identify the configuration of the previously configured eight radio resource blocks.

In addition, in the method for transmitting a synchronization signal by the base station 100 according to the present disclosure, an information transmitting block (hereinafter, PBCH) is interleaved between the radio resource blocks (S120). In the method for transmitting a synchronization signal by the base station 100 according to the present disclosure, a PBCH may be interleaved between the radio resource blocks #1 and #2, a PBCH may be interleaved between the radio resource blocks #2 and #3, and a PBCH may be interleaved between the radio resource blocks #3 and #4 as illustrated in FIG. 3, in the OFDM symbol in the synchronization subframe (a) of the downlink synchronization channel.

Although the following description is omitted in FIG. 3, in the method for transmitting a synchronization signal by the base station 100 according to the present disclosure, a PBCH may be interleaved between the radio resource blocks #5 and #6, a PBCH may be interleaved between the radio resource blocks #6 and #7, and a PBCH may be interleaved between the radio resource blocks #7 and #8, in the radio resource of the OFDM symbol in the synchronization subframe (a) of the downlink synchronization channel.

In the above case, in the method for transmitting a synchronization signal by the base station 100 according to the present disclosure, each of PBCHs may be mapped to an antenna of the base station 100, to which one of two radio resource blocks neighboring the PBCH has been mapped.

For example, in the method for transmitting a synchronization signal by the base station 100 according to the present disclosure, when a PBCH is located between the radio resource blocks #1 and #2, the PBCH may be mapped to an antenna of the base station 100, to which one of the radio resource blocks #1 and #2 is mapped.

In the method for transmitting a synchronization signal by the base station 100 according to the present disclosure, it is also possible to: previously configure and map eight radio resource blocks and PBCHs in the OFDM symbol in the synchronization subframe (a) of the downlink synchronization channel before the operation S100; and when the pre-configured period starts (S100), only identify the configuration of the previously configured eight radio resource blocks and PBCHs.

After that, in the method for transmitting a synchronization signal by the base station 100 according to the present disclosure, timing synchronization and beamforming synchronization are performed by transmitting a timing synchronization signal (e.g. PSS, SSS, and ESS) for timing synchronization and a beam synchronization signal (e.g. BRS) for beamforming synchronization, in the OFDM symbol in the synchronization subframe (a) of the downlink synchronization channel (S130).

Specifically, in the method for transmitting a synchronization signal by the base station 100 according to the present disclosure, timing synchronization with the terminal 10 may be performed by transmitting synchronization signals, i.e. PSS, SSS, and ESS for timing synchronization through a plurality of antenna beams toward the entire region within the cell coverage of the base station 100. The plurality of antenna beams is formed in the timing synchronization frequency region of the OFDM symbol in the synchronization subframe (a).

Meanwhile, in the method for transmitting a synchronization signal by the base station 100 according to the present disclosure, BRS-based beamforming synchronization is performed by transmitting a beam synchronization signal, i.e. a BRS, through antenna beam of different directions formed for each of a plurality of radio resource blocks #1-#8 in the beam synchronization frequency region of the OFDM symbol in the synchronization subframe (a).

That is, in the method for transmitting a synchronization signal by the base station 100 according to the present disclosure, antenna beams of different directions are formed for each of eight radio resource blocks #1-#8. Each of eight radio resource blocks #1-#8 is mapped to each of eight antennas included in the base station 100.

Accordingly, in the method for transmitting a synchronization signal by the base station 100 according to the present disclosure, BRS-based beamforming synchronization with the terminal 10 may be performed by transmitting a BRS through antenna beams A, B, C, D, . . . , H of different directions formed for each of eight radio resource blocks #1~#8.

That is, in the method for transmitting a synchronization signal by the base station 100 according to the present disclosure, as many antenna beams A, B, C, D, . . . , H are generated as the number of antennas included in the base station, and the same antenna beam is generated by binding four neighboring radio resource elements in one radio resource block in view of each of the antenna beams.

In the method for transmitting a synchronization signal by the base station 100 according to the present disclosure, when a previous radio resource block among two radio resource blocks neighboring a PBCH is pre-defined for the transmission (antenna mapping), as illustrated in FIG. 3, the information in a PBCH between the radio resource blocks #1 and #2 may be transmitted through an antenna beam A identical to that of the radio resource block #1, the information in a PBCH between the radio resource blocks #2 and #3 may be transmitted through an antenna beam B identical to that of the radio resource block #2, and the information in a PBCH between the radio resource blocks #3 and #4 may be transmitted through an antenna beam C identical to that of the radio resource block #3 (S130).

Then, in the method for transmitting a synchronization signal by the base station 100 according to the present disclosure, it is identified whether all of OFDM symbols in the synchronization subframe (a), i.e. the radio resource of the downlink synchronization channel have been used (S140). In other words, whether all of 14 OFDM symbols in the synchronization subframe (a) have been used is identified.

In the method for transmitting a synchronization signal by the base station 100 according to the present disclosure, when all of 14 OFDM symbols in the synchronization subframe (a) have not been used (S140 No), antenna beams A, B, C, D, . . . , H having directions different from those of the previous OFDM symbol are generated for radio resource blocks #1-#8 through eight antennas in a next OFDM symbol, and timing synchronization and beamforming synchronization with the terminal 10 are continuously performed (S130).

Accordingly, in the method for transmitting a synchronization signal by the base station 100 according to the present disclosure, antenna beams having directivities different from those of the previous OFDM symbol are generated for radio resource blocks #1-#8 through eight antennas in each of the OFDM symbols in the synchronization subframe (a) of the downlink synchronization channel, so that a BRS for beamforming synchronization may be transmitted in a direction different from that of the previous OFDM symbol for each of eight radio resource blocks #1-#8.

Meanwhile, in the method for transmitting a synchronization signal by the base station 100 according to the present disclosure, when all of 14 OFDM symbols in the synchronization subframe (a) have been used (S140 Yes), an optimum beam and timing between the base station 100 and the terminal 10 are determined on the basis of a result from the timing synchronization and beamforming synchronization proceeded until now (S150).

As described above, in the method for transmitting a synchronization signal by the base station 100 according to the present disclosure, the base station may perform beamforming synchronization on the basis of the structure of a radio resource (OFDM symbol in a synchronization subframe) of a downlink synchronization channel, in which as many antenna beams A, B, C, D, . . . , H are generated as the number of antennas included in the base station, and the same antenna beam is generated by binding four neighboring radio resource elements in one radio resource block in view of each of the antenna beams.

Figure 4:
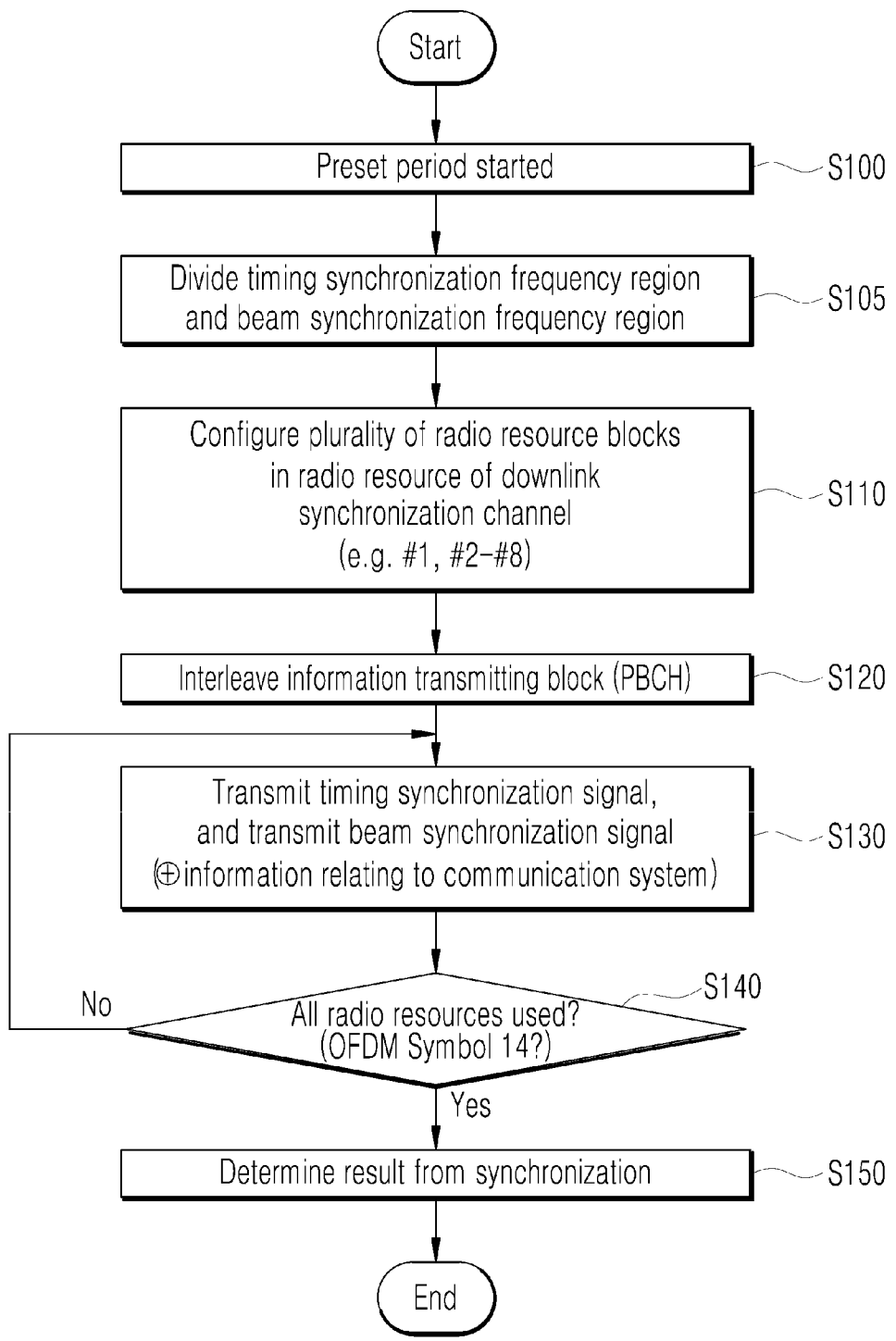
FIG. 4 is a diagram of an example of a flow in which a method for transmitting synchronization signal proceeds according to an embodiment of the present disclosure.

Further, although the following description is omitted from the detailed description with reference to FIG. 4, as described above, a receiving device, i.e. the terminal 10 may perform beamforming synchronization on the basis of a radio resource structure (OFDM symbol in a synchronization subframe) of a downlink synchronization channel, in which as many antenna beams 1, 2, 3, and 4 are generated as the number of antennas included in the terminal, and the same antenna beam is generated by binding eight radio resource elements designated for each of multiple (e.g. eight) radio resource blocks in view of each of the antenna beams.

As described above, when timing synchronization and beamforming synchronization are performed on the basis of a radio resource structure of a downlink synchronization channel according to the present disclosure, a receiving device, i.e. the terminal 10 can rapidly perform beam tracking in a synchronization procedure, thereby reducing the failure of beamforming synchronization due to the failure in tracking an optimum beam.

Finally, according to the present disclosure, during synchronization between the base station 100 and the terminal 10, the terminal 10 can rapidly perform beam tracking, so that the overall beamforming synchronization performance can be improved.

Hereinafter, a terminal for receiving synchronization signal according to an embodiment of the present disclosure will be further specifically described.

Figure 6:
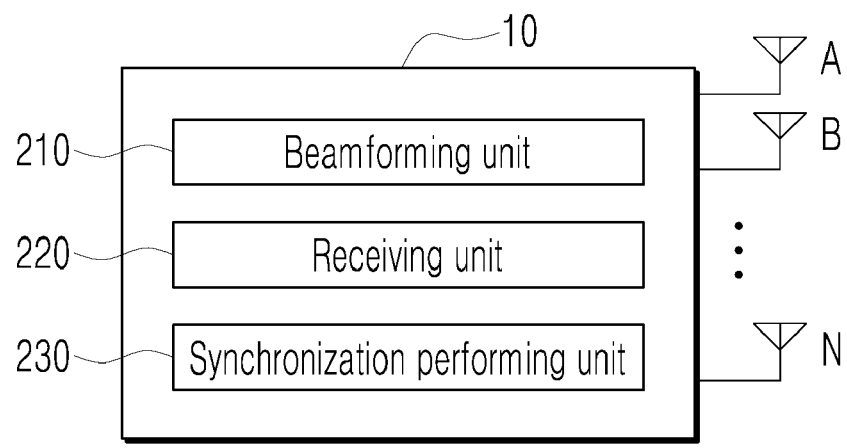
FIG. 6 is a diagram of an example of the configuration of a terminal for receiving synchronization signal according to an embodiment of the present disclosure.

As illustrated in FIG. 6, terminal 10 for receiving synchronization signal according to an embodiment of the present disclosure comprises: a beamforming unit 210 configured to generate two or more antenna beams of different directions through a plurality of antennas; a receiving unit 220 configured to receive a synchronization signal through the two or more antenna beams; and a synchronization performing unit 230 configured to perform beamforming synchronization based on the synchronization signal.

The beamforming unit 210 may configure a plurality of radio resource blocks, each of the plurality of radio resource blocks including two or more neighboring radio resource elements of radio resource elements included in a radio resource for synchronization and generate the two or more antenna beams by a combination of radio resource elements included in each of the plurality of radio resource blocks.

The radio resource may include an information transmitting block for transmitting information related to a communication system between the radio resource blocks.

The terminal 10 is configured to generate antenna beams having different direction through two or more antennas included in the terminal 10, respectively.

Hereinafter, the terminal 10 is assumed to have four antennas and thus generate four antenna beams of different directions.

Accordingly, the terminal 10 may be configured to perform BRS-based beamforming synchronization with the base station 100 by receiving a beam synchronization signal, i.e. BRS, through four antenna beams generated to have different directions.

It is important that the terminal 10 may generate each of four antenna beams generated by using a combination of radio resource elements designated for the above plurality of radio resource blocks in a radio resource designated for inter-device synchronization.

That is, the terminal 10 may generate antenna beams 1, 2, 3, and 4 for each of four antennas by using a combination of radio resource elements designated for a plurality of radio resource blocks #1-#8 in the radio resource of an OFDM symbol in a synchronization subframe (a) of a downlink synchronization channel.

The scheme of designating a radio resource element of each of radio resource blocks for each of antennas in the terminal 10 may be a random scheme or a sequential scheme.

In FIG. 3, the case of sequentially designating a radio resource element of each of radio resource blocks for each of antennas in the terminal is illustrated.

In the case of the radio resource block #1 of FIG. 3, the terminal 10 may use a sequentially designated radio resource element 1-1 of the radio resource block #1 in order to make an antenna beam 1, a sequentially designated radio resource element 1-2 of the radio resource block #1 in order to make an antenna beam 2, a sequentially designated radio resource element 1-3 of the radio resource block #1 in order to make an antenna beam 3, and a sequentially designated radio resource element 1-4 of the radio resource block #1 in order to make an antenna beam 4.

Accordingly, the terminal 10 may make the antenna beam 1 by using a combination of the radio resource element 1-1 of the radio resource block #1, a radio resource element 2-1 of the radio resource block #2, a radio resource element 3-1 of the radio resource block #3, a radio resource element 4-1 of the radio resource block #4, a radio resource element 5-1 of the radio resource block #5, a radio resource element 6-1 of the radio resource block #6, a radio resource element 7-1 of the radio resource block #7, and a radio resource element 8-1 of the radio resource block #8. As described above, the terminal 10 may be configured to perform BRS-based beamforming synchronization with the base station 100 by forming antenna beams 1, 2, 3, and 4 of different directions and receiving a BRS through the four antenna beams 1, 2, 3, and 4.

That is, the terminal 10 of the present disclosure may generate as many antenna beams 1, 2, 3 and 4 as the number of antennas included in the terminal. In view of each of the antenna beams, one antenna beam is generated by binding eight radio resource elements from each of eight radio resource blocks.

The terminal 10 may repeatedly perform a series of beam tracking procedures of measuring a Signal-to-Interference-plus-Noise Ratio (SINR) of a beam synchronization signal, i.e. BRS, for each of antenna beams A, B, C, D, . . . , H of the base station 100, which is received by each of antenna beams 1, 2, 3 and 4 generated by the terminal, for each of OFDM symbols in a synchronization subframe (a) of a downlink synchronization channel and reporting a result from the measurement to the base station 100.

When beamforming synchronization between the base station 100 and the terminal 10 is performed based on beam synchronization signal using the above described scheme, the terminal 10 can rapidly perform beam tracking during the beamforming synchronization, thereby lowering a failure rate of the beamforming synchronization and improving the overall beamforming synchronization performance.

Hereinafter, a method for receiving synchronization signal according to an embodiment of the present disclosure will be further specifically described.

Figure 7:
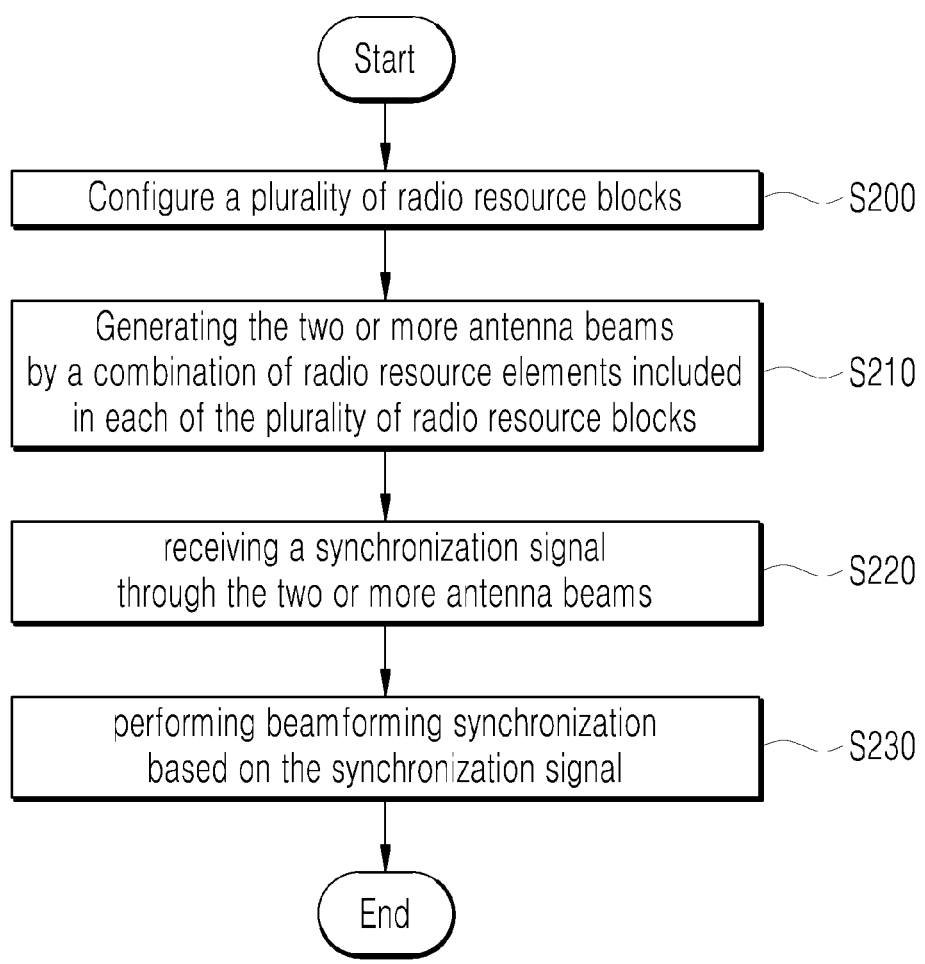
FIG. 7 is a diagram of an example of a flow in which a method for receiving synchronization signal proceeds according to an embodiment of the present disclosure.

As illustrated in FIG. 7, the terminal 10 according to an embodiment of the present disclosure configures a plurality of radio resource blocks (S200).

Each of the plurality of radio resource blocks may include two or more neighboring radio resource elements of radio resource elements included in a radio resource for synchronization.

The radio resource may include an information transmitting block for transmitting information related to a communication system between the radio resource blocks.

Then, the terminal 10 according to an embodiment of the present disclosure generates the two or more antenna beams by a combination of radio resource elements included in each of the plurality of radio resource blocks (S210).

For example, in the case of the terminal 10 has four antennas, the terminal 10 may generate antenna beams 1, 2, 3, and 4 for each of four antennas by using a combination of radio resource elements designated for a plurality of radio resource blocks in the radio resource of an OFDM symbol in a synchronization subframe (a) of a downlink synchronization channel.

The scheme of designating a radio resource element of each of radio resource blocks for each of antennas in the terminal 10 may be a random scheme or a sequential scheme.

Then, the terminal 10 according to an embodiment of the present disclosure receives a synchronization signal through the two or more antenna beams (S220) and performs beamforming synchronization based on the synchronization signal (S230).

When beamforming synchronization between the base station 100 and the terminal 10 is performed based on beam synchronization signal using the above described scheme, the terminal 10 can rapidly perform beam tracking during the beamforming synchronization, thereby lowering a failure rate of the beamforming synchronization and improving the overall beamforming synchronization performance.

Meanwhile, implementations of subject matters and functional operations in the present specification may be implemented in any other type of digital electronic circuitry, or in any computer software, firmware or hardware including the structures disclosed herein and their structural equivalents, or in any combination thereof. The implementations of the subject matters in the present specification may be implemented as one or more computer program products, i.e., one or more modules of computer program commands encoded on a tangible program storage medium for execution by a processing system or to control the operation of the processing system. A computer-readable medium includes a machine-readable storage device, a machine-readable storage substrate, a memory device, a machine-readable composition of material affecting a radio wave type signal, or any combination thereof.

As used herein, "system" or "device" includes all kinds of mechanisms, apparatuses, and machines for processing data including, for example, a programmable processor, a computer, a multiprocessor, or a computer. In addition to the hardware, the processing system may include, e.g., a code configuring processor firmware, and a code configuring an execution environment for the computer program upon request of, for example, a protocol stack, a database management system, an operating system, or one or more combinations thereof, or the like.

A computer program (also known as a program, software, a software application, a script or a code) may be written in any form of a programming language including a compiled or interpreted language, or a priori or procedural language, and may be deployed in any form including independent programs or modules, components, subroutines, or other units suitable for use in a computer environment. The computer program may not necessarily correspond to a file in a file system. The program may be stored in a single file provided to the requested program, in multiple interactive files (for example, a file storing one or more modules, subprograms or portions of a code), or in a part of a file (for example, one or more scripts stored in a markup language document) containing other programs or data. The computer program may be located on one site or distributed across multiple sites such that it is deployed to run on multiple computers interconnected by a communications network or on one computer.

The computer readable medium suitable for storing computer program instructions and data may include, for example, semiconductor memory devices such as an EPROM, an EEPROM and flash memory devices, all sort of non-volatile memories including magnetic disks such as internal hard disks or external disks, and magnetic optical disks, CD-ROM and DVD-ROM disks, a media, and memory devices. A processor and a memory may be supplemented by special purpose logic circuits or integrated therewith.

Implementations of the subject matter described herein may be realized on an arithmetic system including, for example, a back-end component such as a data server, a middleware component such as an application server, a front-end component such as a client computer with a web browser or a graphical user interface allowing a user to interact with the implementations of the subject matter described herein, or one or more combinations of the back-end component, the middleware component, and the front-end component. The components of the system may be interconnected by any form or medium of digital data communications such as, for example, a communication network.

While the present disclosure includes a number of specific implementation details, they are not to be construed as limitations on any invention or the claimable scope. Rather, it should be understood as a description of features that may be specific to a particular embodiment of a particular invention. Similarly, the specific features described herein in the context of individual embodiments may be implemented in combination in a single embodiment. Conversely, various features that are described in the context of a single implementation are also implemented in multiple implementations separately or in any suitable sub-combination. Moreover, although features are described above as acting in certain combinations and even initially claimed as such, one or more features from a claimed combination are, in some cases, excised from the combination, and the claimed combination is directed to a sub-combination or variation of a sub-combination.

In addition, while operations are depicted in the drawings in a particular order in the specification, this should not be understood as requiring that such operations be performed in the particular order shown or in sequential order, or that all illustrated operations be performed, to perform desirable results. In certain circumstances, multitasking and parallel processing are advantageous. Moreover, the separation of various system components in the implementations described above should not be understood as requiring such separation in all implementations, and it should be understood that the described program components and systems can generally be integrated together in a single software product or packaged into multiple software products.

As described above, specific terms used in the present specification are not intended to limit the present disclosure. Therefore, while the present disclosure has been particularly shown and described with reference to various embodiments thereof, it will be understood by those skilled in the art that various alterations, modifications, and changes of the embodiments are made therein without departing from the scope of the present disclosure. The scope of the present disclosure described in the detail description is indicated by the following claims and it should be interpreted that the meanings and scopes of the claims and all the modifications and changes derived from the same concept thereof are included in the scope of the present disclosure.

What is claimed is:

1. An apparatus for transmitting a synchronization signal, the apparatus comprising:
   a radio resource configuring unit configured to:
      divide a radio resource designated for synchronization into a timing synchronization frequency region and a beam synchronization frequency region, and
      form a plurality of radio resource blocks in the beam synchronization frequency region, each of the plurality of radio resource blocks including two or more neighboring radio resource elements among radio resource elements included in the beam synchronization frequency region;
   a timing synchronization performing unit configured to transmit, to a terminal through at least one antenna beam generated in the timing synchronization frequency region, a first synchronization signal for frequency synchronization and a second synchronization signal for frame synchronization in order to perform timing synchronization; and
   a beamforming synchronization performing unit configured to transmit a beam synchronization signal, as a third synchronization signal, to the terminal through antenna beams generated for the plurality of radio resource blocks formed in the beam synchronization frequency region in order to perform beamforming synchronization,
   wherein:
      the number of the radio resource elements included in each of the plurality of radio resource blocks is determined by the number of antenna beams being able to be generated by the terminal receiving the beam synchronization signal.

2. The apparatus of claim 1, wherein the beamforming synchronization performing unit transmits the beam synchronization signal, as the third synchronization signal, in different directions through antenna beams formed for each of the plurality of radio resource blocks, to perform beamforming synchronization based on the beam synchronization signal.

3. The apparatus of claim 1, wherein the terminal receives the beam synchronization signal through two or more antenna beams of different directions to perform beamforming synchronization based on the beam synchronization signal, and
   each of the two or more antenna beams is generated by a combination of radio resource elements designated for each of the plurality of radio resource blocks.

4. The apparatus of claim 2, wherein the radio resource is a symbol among a plurality of symbols included in a downlink synchronization channel subframe periodically allocated, and
   the beamforming synchronization performing unit transmits the beam synchronization signal in a direction different from that of a previous symbol for each of the plurality of radio resource blocks in each of the plurality of symbols.

5. The apparatus of claim 1, wherein the radio resource configuring unit configures an information transmitting block for transmitting information related to a communication system between the radio resource blocks, and
   information allocated to the information transmitting block is transmitted through an antenna beam generated for one of two radio resource blocks neighboring the information transmitting block.

6. The apparatus of claim 1, wherein the radio resource element corresponds to a minimum frequency element of a radio resource required for generating one antenna beam by the terminal.

7. The apparatus of claim 1, wherein:
   the number of the plurality of radio resource blocks is determined by the number of antennas included in the apparatus transmitting the beam synchronization signal; and
   the number of the radio resource elements included in each of the plurality of radio resource blocks is the same as the number of antenna beams being able to be generated by the terminal receiving the beam synchronization signal.

8. A method for transmitting a synchronization signal, the method comprising:
   dividing a radio resource designated for synchronization into a timing synchronization frequency region and a beam synchronization frequency region;
   configuring a plurality of radio resource blocks in the beam synchronization frequency region, each of the plurality of radio resource blocks including two or more neighboring radio resource elements among radio resource elements included in the beam synchronization frequency region;
   transmitting, to a terminal through at least one antenna beam generated in the timing synchronization frequency region, a first synchronization signal for frequency synchronization and a second synchronization signal for frame synchronization in order to perform timing synchronization; and
   transmitting a beam synchronization signal, as a third synchronization signal, to the terminal through antenna beams generated for the plurality of radio resource blocks configured in the beam synchronization frequency region in order to perform beamforming synchronization,
   wherein:
      the number of the radio resource elements included in each of the plurality of radio resource blocks is determined by the number of antenna beams being able to be generated by the terminal receiving the beam synchronization signal.

9. The method of claim 8, wherein the transmitting the third synchronization signal comprises transmitting the beam synchronization signal in different directions through antenna beams formed for each of the plurality of radio resource blocks, to perform beamforming synchronization based on the beam synchronization signal.

10. The method of claim 9, wherein the terminal receives the beam synchronization signal through two or more antenna beams of different directions to perform beamforming synchronization based on the beam synchronization signal,
    wherein each of the two or more antenna beams is generated for a combination of radio resource elements designated for each of the plurality of radio resource blocks.

11. The method of claim 9, wherein the radio resource is a symbol among a plurality of symbols included in a downlink synchronization channel subframe periodically allocated, and
    the transmitting the third synchronization signal comprises transmitting the beam synchronization signal in a direction different from that of a previous symbol for each of the plurality of radio resource blocks in each of the plurality of symbols.

\* \* \* \* \*